United States Patent
Barker et al.

(10) Patent No.: US 6,980,563 B2
(45) Date of Patent: Dec. 27, 2005

(54) METHOD AND SYSTEM FOR FAST ETHERNET SERIAL PORT MULTIPLEXING TO REDUCE I/O PIN COUNT

(75) Inventors: Kenneth James Barker, Holly Springs, NC (US); Charles Reeves Hoffman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/834,591

(22) Filed: Apr. 13, 2001

(65) Prior Publication Data
US 2001/0050921 A1 Dec. 13, 2001

Related U.S. Application Data

(60) Provisional application No. 60/196,832, filed on Apr. 13, 2000.

(51) Int. Cl.[7] ................................................ H04J 3/16
(52) U.S. Cl. ........................ 370/465; 370/535; 370/537
(58) Field of Search ............................... 370/445, 463, 370/465, 535, 537, 538

(56) References Cited

U.S. PATENT DOCUMENTS

| | | | | |
|---|---|---|---|---|
| 4,731,785 A | * | 3/1988 | Ferenc et al. | 370/537 |
| 4,873,663 A | * | 10/1989 | Baranyai et al. | 365/73 |
| 6,385,208 B1 | * | 5/2002 | Findlater et al. | 370/419 |
| 6,651,107 B1 | * | 11/2003 | Conley et al. | 709/250 |
| 6,795,881 B1 | * | 9/2004 | Bachrach | 710/100 |

* cited by examiner

Primary Examiner—Ricky Ngo
Assistant Examiner—Richard Chang
(74) Attorney, Agent, or Firm—Joscelyn G. Cockburn

(57) ABSTRACT

A system and method of reducing the input and output pins used to interface a fast serial port Ethernet processing system using multiplexing. Using the system of the present invention, four pins can allow a plurality of Ethernet communication paths to be connected to a single processor on a substrate. These four connections include a clocking input as well as a strobe signal which coordinates the multiplexing and identifies the time period for a predetermined source. The physical layer and the processor are each provided with a multiplexor which is controlled by the strobe to select the network to be coupled at any given time. The multiplexor includes a counter which is incremented by the clocking input and reset by the strobe signal.

2 Claims, 3 Drawing Sheets

FIG. 3

| | Clock | | | | | | Clock | | | | | | | |
|---|---|---|---|---|---|---|---|---|---|---|---|---|---|---|
| | 0 | 1 | 2 | 3 | ... | n | n+1 | n+2 | n+3 | n+4 | ... | 2n+1 | 2n+2 | 2n+3 |
| network 0 | x | | | | | | | | | | | | | |
| network 1 | | x | | | | | | | | | | | | |
| network 2 | | | x | | | | | | | | | | | |
| network 3 | | | | x | | | | | | | | | | |
| ... | | | | | | | | | | | | | | |
| network n | | | | | | x | | | | | | | | |
| strobe | x | | | | | | x | | | | | x | | |

# METHOD AND SYSTEM FOR FAST ETHERNET SERIAL PORT MULTIPLEXING TO REDUCE I/O PIN COUNT

CROSS REFERENCE TO RELATED PATENTS

The present patent application relates to and claims priority of Provisional Patent Application 60/196,832 entitled "Fast Ethernet Serial Port Multiplexing to Reduce I/O Pin Count" filed Apr. 13, 2000 by Kenneth J. Barker and Charles R. Hoffman, the inventors of the present patent application.

The present invention is related to the following patents which are specifically incorporated by reference herein:

Patent application Ser. No. 09/123,547 filed Jul. 28, 1998 by S. S. Allison et al. and entitled "Architecture for a Multiplex Port Adapter having a Single Media Access Control (MAC) with a Single I/O Port". This patent is sometimes referred to herein as the Single Port Patent.

Patent application Ser. No. 09/123,899 filed Jul. 28, 1998 by S. S. Allison et al. And entitled "Architecture for a Multi-Port Adapter with a Single Media Access Control (MAC)". This patent is sometimes referred to herein as the TDM MAC Patent.

BACKGROUND OF THE INVENTION

1. Field of the Invention

The present invention relates to connecting a plurality of data sources to a single chip. More particularly, the present invention relates to an improved system and method for fast Ethernet serial port multiplexing to reduce the number of input/output pins required on each chip for a given number of sources.

2. Background Art

As semiconductor chips become more powerful, they have become capable of processing more information and handle more inputs and outputs through connections such as Ethernet ports. Unfortunately, at the same time the semiconductors have become more powerful and capable of processing larger loads, these same semiconductors are becoming smaller in physical size, leading to smaller surface areas in which to attach pins (or leads) for the greater number of ports or sources. This leads to a paradox: smaller and more powerful processors are capable of supporting more ports from a processing stand point but as the size shrinks, there is less area in which to attach the leads and therefore the smaller package would suggest that fewer, rather than more, ports be attached.

Each physical layer connection requires at least one input port and one output port. One approach in the prior art is to have each input or physical layer connection as a separate set of pins on the chip. When a small number of physical layer connections is involved for a given chip, this is a manageable number of input and output pins for connection to the chip.

However, as the number of physical layer connections increases in a system where each connection requires its own set of input/output pins, the chip must grow larger to have enough space to accommodate the increased number of pins. However, as has been stated previously, the trend in chip design is toward smaller chips, meaning less room for attachment of the pins, and, therefore, a chip which can accommodate fewer connections with input/output pins.

Other disadvantages and limitations of the prior art systems will be apparent to those skilled in the art in view of the following description of the present invention.

SUMMARY OF THE INVENTION

The present invention overcomes the disadvantages and limitations of the prior art system by providing an efficient, yet simple and inexpensive way of accommodating the inputs from a plurality of ports which are feeding a single chip.

This system allows for an increased number of physical layer connections to be attached to a single chip without requiring a commensurate increase in the number of input/output pins. This means that the physical size of the chip no longer must become larger to accommodate an increased number of physical layer connections or sources being serviced by a single chip or a single processing system.

The system of the present invention also has the advantageous effect that it does not require a large number of interconnections. In fact, in its preferred embodiment, a set of four inputs can be used to service a potentially-unlimited number of sources.

The present invention is advantageous in that, by requiring only a limited number of input/output pins, it allows for the chip to shrink in size as the technology for increasing the density of circuit elements increases the number of components which can be mounted on a single chip and the number of sources which can be served by a single chip.

The present invention has the advantage that it is simple and easy to implement, with a minimum of additional hardware and/or software elements. By having a relatively simple design, the cost to design and implement the unit of the present invention is not great. Further, the present invention allows implementing the design in hardware, so the impact on the speed of processing is negligible.

The present invention is a system in which an increased number of inputs and outputs are accommodated through the multiplexing of inputs and outputs through a reduced number of input and output pins, ideally where a single input and a single output are used. At least one indicator or strobe signal is employed in one embodiment of the present invention to indicate when a predetermined source is engaged and the various sources are engaged in sequential order.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Figure 1:
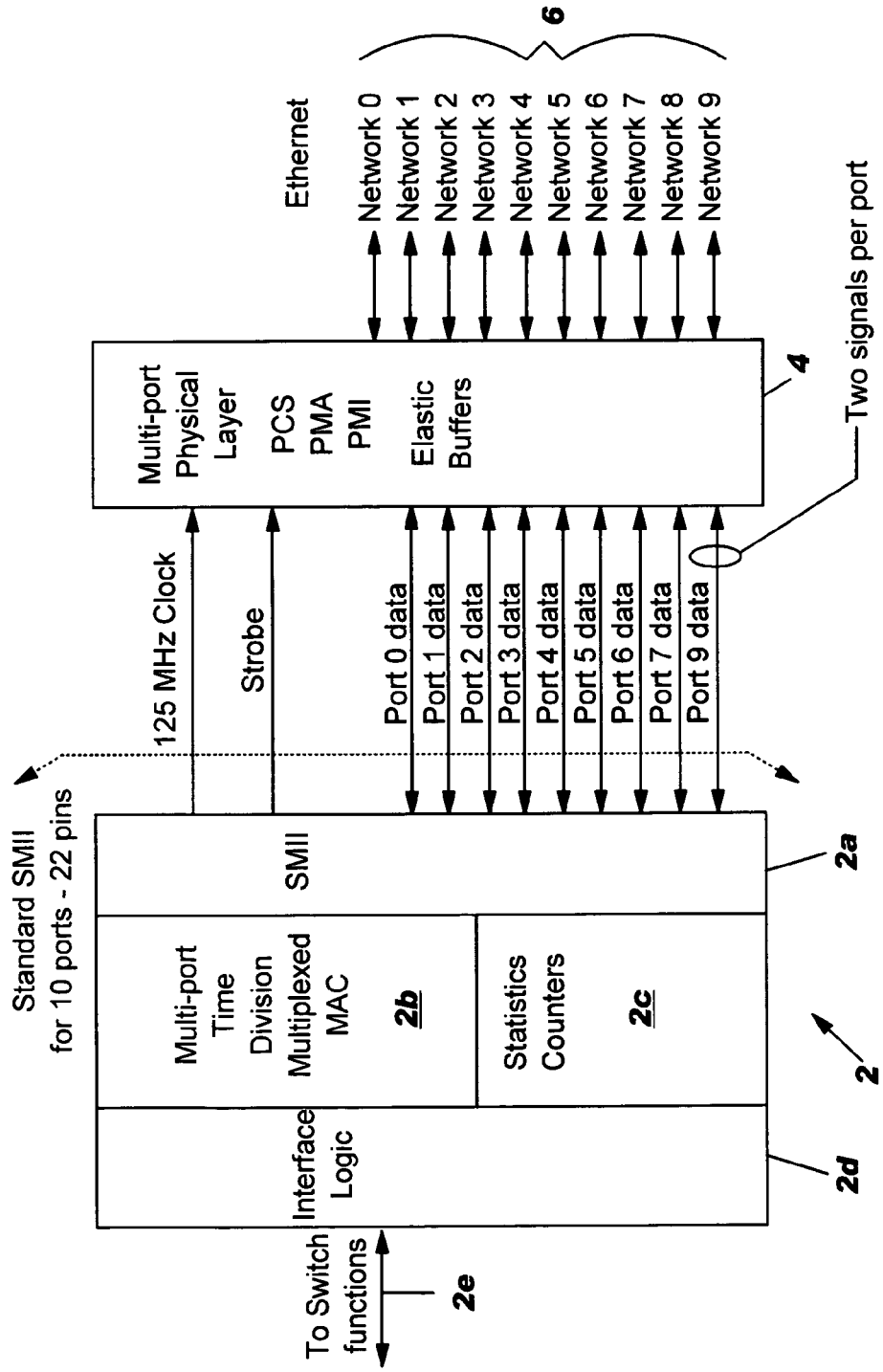
Figure 2:
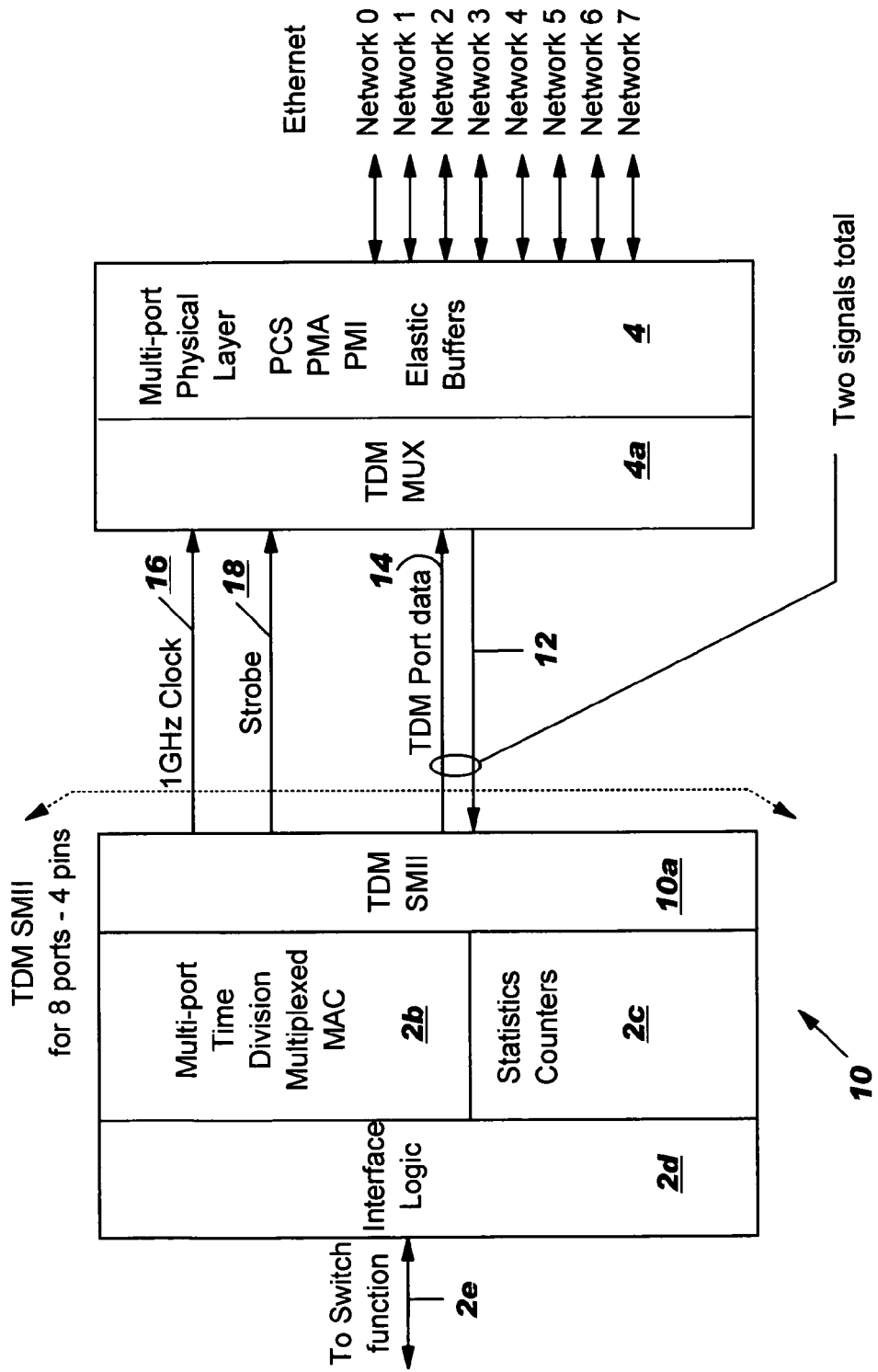

Having thus described some of the limitations of the prior art systems and some objects and advantages of the present invention, other objects and advantages will be apparent to those skilled in the art in view of the following figures illustrating the present invention in which:

FIG. 1 illustrates a conventional fast Ethernet processing system of the prior art;

FIG. 2 illustrates the structure of the improved system of the present invention with a reduced pin count; and FIG. 3 depicts a table illustrating a timing diagram for use in the chip illustrated in FIG. 2.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

FIG. 1 illustrates a current design of a fast Ethernet system 2 which services 10 Ethernet networks 6 (individually designated as Network0 through Network9) using 22 pins (2 for each network or physical layer connection plus a strobe and a clock) connected to a multi-port physical layer 4 comprising elastic buffers. In this system, the clock of the chip 2 operates at a particular speed (indicated as 125 megahertz, a representative speed) and includes a pair of pins for each of the ports, allowing each of the ports to be serviced during each of the clock cycles.

The Ethernet system 2 includes a serial media independent interface (or SMII) portion 2a which is coupled to a multi-port time division multiplexed MAC 2b and to statistics counters 2c such as are described in a copending patent application of Kenneth J. Barker entitled "Method and System for Recording Statistic about a Data Transmission Network", Ser. No. 09/548,909 filed Apr. 13, 2000, a patent application which is specifically incorporated herein by reference. Interface logic 2d coupled the chip via outputs 2e to switch functions.

The multi-port time division multiplexed MAC 2b of this system may be of any conventional design, one of which is described and shown in the Single Port Patent and the TDM MAC Patent referenced above. Details of the construction of this system and its operation are shown in an illustrative embodiment in these patents.

The present invention is described in connection with a communications technique known as Serial Media Independent Interface (SMII) system for serial Ethernet communication. A type of SMII system is used in the IBM network processor known as the Rainer chip which has been announced and is marketed widely at this time.

FIG. 2 illustrates the system (which, in its preferred embodiment is a single chip) of the present invention in which a processor 10 includes four ports mounted thereon. The four ports comprise an input port 12, an output port 14, a clock 16 and a strobe 18. The purpose of the signal on the strobe 18 is to identify a source or input as a base and to consider each other source in turn. That is, in some circumstances, 8 sources (or 10 sources in a system parallel to that of FIG. 1) may be multiplexed and identified as network0 through network7. The strobe signal may be used to identify any of these sources as the base, but traditionally it would be the first source or network0 which is identified by the strobe signal and serviced during clock pulse 0 in FIG. 3. Then, the next source, or network1, would be serviced one clock signal later (clock pulse 1 in FIG. 3), then the third source or network2 would be serviced on the next clock pulse until the last source (network7) is serviced during clock pulse n in FIG. 3, where n is the number of sources. Then, at the next clock pulse, it is time to service the first source (network0) again and another strobe pulse indicates that this is the base or first source.

The clock in this system is shown as operating at 1 gigahertz, or eight times faster than the 125 megahertz of the example of FIG. 1, allowing each of the eight multiplexed networks to be served at the effective rate of 125 megahertz.

Each of the communicating elements of FIG. 2 includes a time division multiplex or TDM module of conventional design. The TDM for the processor integrates with and interfaces to a conventional SMII interface to allow for conventional SMII processing of Ethernet communications. The elastic buffers 4 are coupled to a TDM multiplexor 4a to provide a similar interface for coupling to the system 10.

Elastic buffers 4 are well known in the trade and are sold by various vendors. Some of these elastic buffers are produced with a Serial Media Independent Interface (SMII) of the type which is suited for the present invention, although the present invention is not limited to this type of interface for serial data. One such vendor who offers a suitable elastic buffer is Broadcom.

A design of the time division multiplexor used in the present invention would typically include a sequencer to service the physical layer connections or sources in order and then return to service the first source the clock pulse after the nth or final source has been serviced. This sequencer could employ a counter which keeps track of the physical layer connection or network which is being serviced at any given time, although this may not be required and may be implemented in hardware or software as desired. This counter would be coupled to the clock 16 and the strobe 18 and could be incremented on each clock pulse and could be reset by each strobe 18 to provide a simple and efficient method of keeping track of which physical layer connection is being serviced at any given time, although other schemes for sequentially servicing the networks could be used to advantage in the present invention.

FIG. 3 is a table which illustrates an illustrative timing for a system using the present invention. The first line indicates the system at an initial clock 0 at which time the first strobe signal indicates that a first source network0 is served. The next clock pulse is the next clock 1 at which time a second source network1 is served. This continues until networkN (the last network, or network7 in the example of FIG. 2) is served at clock n, then at clock n+1, the strobe occurs again and network0 is served.

Of course, many modifications of the present invention will be apparent to those skilled in the relevant art in view of the foregoing description of the preferred embodiment, taken together with the accompanying drawings. For example, the system for multiplexing could be changed without departing from the spirit of the present invention, and the number of networks which are multiplexed may be adjusted to fit the needs of the design. Further, a different system for indicating the sequence of the inputs/outputs could be used and in some of these alternatives where the source is identified, the sources need not be served in order. Additionally, the present invention, although it has been described in the context of fast Ethernet communication, is equally applicable to other forms of communication. Many other modifications and adaptations to the present system could be employed to advantage without departing from the spirit of the present invention, and some of the advantages of the present invention could be achieved without the corresponding use of other related features. For example, it is not required that both the inputs and outputs be multiplexed in the arrangement shown and only one might be multiplexed in a given situation. Accordingly, the foregoing description of the preferred embodiment should be considered as merely illustrative of the principles of the present invention and not in limitation thereof.

Having thus described the invention, what is claimed is:

1. A system for processing a plurality of serial Ethernet communications wherein the system includes a strobe signal and a clock signal, the system comprising:

a processor coupled to a multiplexed set of ports for input and output;

a first storage for a first Ethernet communication;
a second storage for a second Ethernet communication;
in response to the strobe signal, coupling the processor to the first storage for handling the first Ethernet communication; and
in response to the clock signal, changing from the one Ethernet storage to another Ethernet storage, whereby a single set of ports is coupled to a plurality of networks in sequence, with the sequence being responsive to the strobe signal.

2. A system for coupling a plurality of sources to a single processing chip, the system comprising:
a substrate including a system for processing Ethernet inputs;
a clock input for determining a time period for processing the input from a single source;
a single input gate for a single input;
a sequencer which determines which source ss being processed during the time period and which services a different source during the next clock period said sequence including a counter which indicates which source is serviced at any time and the counter is coupled to the clock input for indexing the counter in response to a clock pulse; and
a strobe input and the counter is coupled to the strobe input and is reset by a signal on the strobe input.

* * * * *